P. EVANS.
POWER TRANSMISSION MECHANISM.
APPLICATION FILED OCT. 26, 1910.
1,095,094.
Patented Apr. 28, 1914.
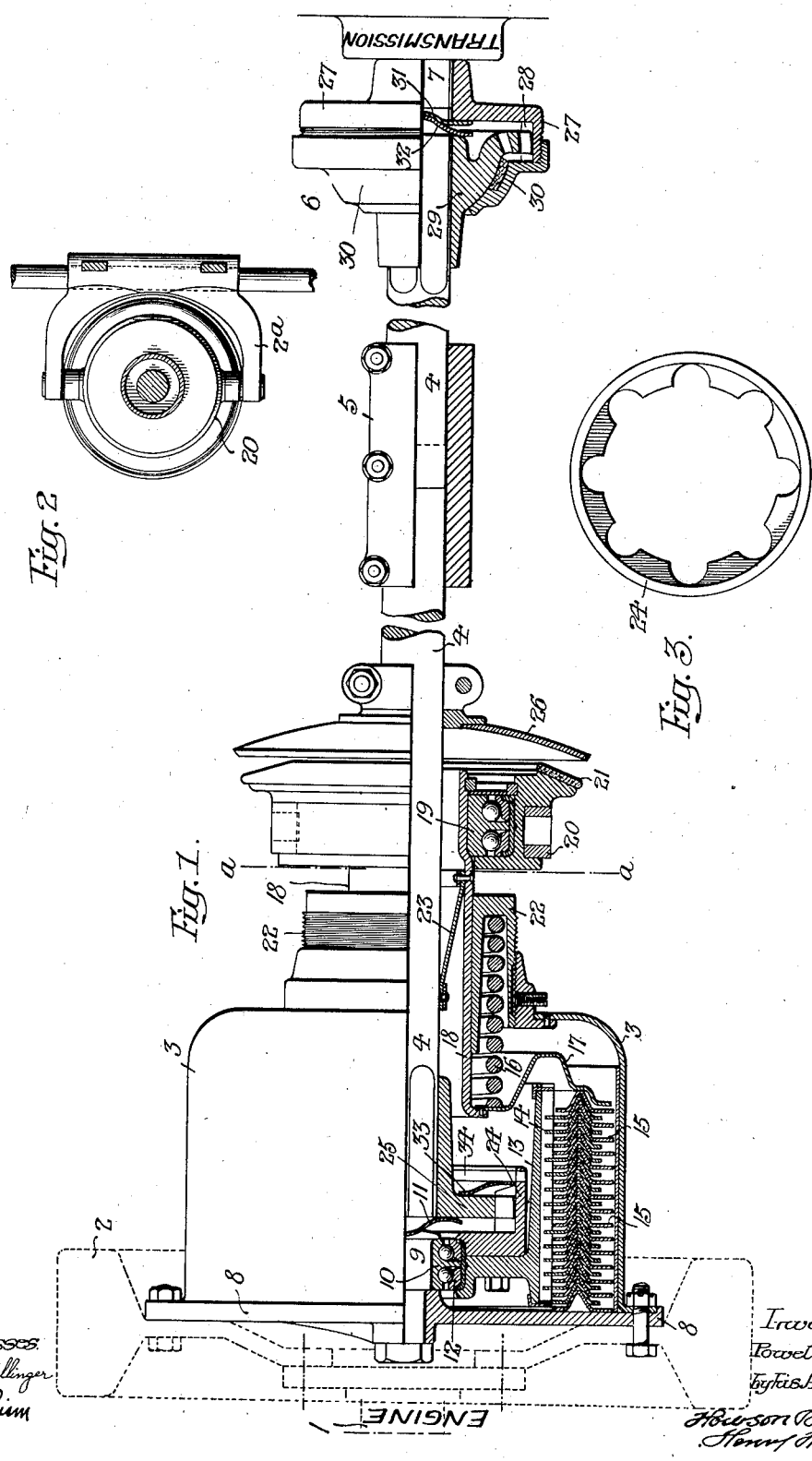

UNITED STATES PATENT OFFICE.

POWELL EVANS, OF PHILADELPHIA, PENNSYLVANIA.

POWER-TRANSMISSION MECHANISM.

1,095,094.  Specification of Letters Patent.  Patented Apr. 28, 1914.

Application filed October 26, 1910. Serial No. 589,196.

*To all whom it may concern:*

Be it known that I, POWELL EVANS, a citizen of the United States, residing in Philadelphia, Pennsylvania, have invented certain Improvements in Power-Transmission Mechanism, of which the following is a specification.

One object of my invention is to provide a new and improved combination and arrangement of apparatus for transmitting power from the engine to the so-called " transmission " of motor vehicles; it being especially desired to provide such an assemblage of parts as will materially shorten the length of the working parts of the apparatus.

Another object of the invention is to provide a combination of parts such as indicated above which may be readily assembled or separated, and which while being relatively simple and substantial in construction may be manufactured, installed, and maintained at a cost materially less than is at present required in similar structures.

Another object of my invention is to provide a combination of apparatus for transmitting power from the engine shaft to the transmission of a motor vehicle, which shall be compact and well protected, shall require no alining, and shall not be likely to get out of order or require repairs under operating conditions.

It is further desired to provide a combination of apparatus of the general type above noted which shall have one less bearing than is ordinarily considered necessary; the shaft connecting the crank shaft of the engine with the transmission, together with the parts associated with said shaft, being free to accommodate themselves to variations in the position of the various parts with which they are associated, without setting up injurious strains or interfering with the efficiency of operation of the apparatus.

These objects and other advantageous ends I secure as hereinafter set forth, reference being had to the accompanying drawings, in which;—

Figure 1, is an elevation partly in section illustrating the apparatus forming part of my invention; Fig. 2, is a vertical section on the line *a—a*, Fig. 1, and Fig. 3, is a side elevation of one of the details of my invention.

In Fig. 1 of the above drawings, 1 represents the crank shaft of an engine to which is suitably fixed a fly wheel 2. This in turn has bolted to it a casing 3 which in this instance is connected to or forms part of one member of a clutch. An intermediate shaft 4 is connected as hereinafter described to the second member of the clutch and is made in two sections operatively joined by a spacer coupling 5; the other end of this intermediate shaft being connected through a universal joint 6 with a third shaft 7 connected in this case to the transmission. The clutch casing 3 is connected to the fly wheel 2 through a plate 8 concentric with the engine shaft and having centrally mounted in it a stud 9 carrying one member 10 of a ball bearing and lying in such position as to constitute an abutment for a bearing washer 11. Upon the second member 12 of the ball bearing is fixed the second clutch member 13 which consists of a core provided with ribs and carrying a series of inner plates 14. These alternate with a second series of outer plates 15 non-rotatably connected to the clutch casing 3 also by a ribbed structure; the construction being preferably that described and claimed in my Patent No. 940,679, dated November 23, 1909. These two sets of plates are normally forced into close frictional engagement with each other by means of a spiral spring 16 concentric with the intermediate shaft 4 or by any other suitable arrangement of springs; power being transmitted in this instance from said spring to the end-most plate 15 through the plate 17.

A tubular structure 18 engaging the plate 17 and extending through the spring 16, has mounted on its outer end one member 19 of a ball bearing whose second member loosely carries a collar 20 for the reception of the clutch operating fork 2ª and has also attached to it one member 21 of a brake. The spring 16 is adjustably confined in position by means of a sleeve 22, as fully set forth in my patent aforesaid, and in order to prevent escape of lubricant from the clutch casing I provide a collar or sleeve 23 of leather or other suitable flexible material which makes a liquid tight joint both with the intermediate shaft 4 and with the interior of the tubular structure 18, while permitting relative sidewise movement of said parts. Also carried by and fixed to the member 12 of the ball bearing mounted on the stud 9, is one member 24 of a toothed clutch which serves as a universal coupling, this member being, as shown in Fig. 3, in the form of a short drum having inwardly projecting teeth between which are formed semi-cylindrical cavities. It will be understood that this member, while rigidly connected to the core 13 of the plate clutch so as to turn with it on the ball bearing, may be separable from these parts, although under operating conditions it is in effect integral therewith. The second member of the tooth clutch or coupling is formed by a plate 25 provided with a hub fitted to and fixed upon the squared end of the intermediate shaft 4; this plate having its periphery formed with semi-circular teeth fitting the similarly shaped recesses of the member 24 and having said periphery slightly curved transversely on a radius struck from a point in the center line of the shaft 4 at a distance from the end thereof substantially equal to half the thickness of the plate 25.

The bearing washer 11 is interposed between the head of the stud 9 and the adjacent face of this toothed plate 25 and is spherically curved to properly support this latter regardless of its greater or less inclination. A second brake member 26 is fixed to the shaft 4 adjacent to the member 21 and it will be noticed that the co-acting surfaces of these two members are spherically curved to be substantially concentric with the center of movement from which was described the spherical surface of the edge of the plate 25; the shaft 4 being thus capable of swinging through an angle limited only by the space between it and the end of the tubular structure 18.

For the purpose of permitting convenient and rapid assembly or separation of the various parts so far described, the intermediate shaft 4 is made of two sections connected by the coupling 5 as previously indicated; the arrangement being such that the ends of said shafts are a greater or less distance apart.

As will be understood by those skilled in the art, the toothed clutch heretofore referred to constitutes a universal joint, and a second similar universal joint 6 is provided, as noted, between the intermediate shaft and the transmission 7. In the case illustrated this second universal joint includes a flanged plate 27 having a hub for the reception of the squared end of the shaft 7 and like the member 24 of the plate clutch is provided with a series of inwardly projecting teeth, indicated at 28, between which are elongated semi-cylindrical recesses. Mounted on the squared end of the intermediate shaft 4 is a second plate or clutch member 29 having substantially semi-circular teeth designed to fit into the aforesaid recesses of the member 27 and so made that the surface of its edge is spherically curved from a point in the center line of the said shaft 4, as described in connection with the universal joint 24—25. This member 29 is held to the member 27 by means of a coupling element 30 preferably of pressed metal having threads engaging corresponding threads on said member.

A washer 31 having a spherical bearing surface is mounted centrally of the member 27 in position to co-act with a second like bearing washer 32 similarly mounted on the adjacent end of the member 29; both of these washers being preferably dished or curved at their central portions so as to constitute centralizing means of ample wearing surface whereby the thrust of the members between which they are mounted may be limited to a confined and predetermined area. I likewise provided a washer 33 mounted between the clutch member 25 and a retaining washer 34.

Under operating conditions it will be seen that the plate clutch casing 3 and its associated parts are absolutely independent of the intermediate shaft in so far as any lateral movement of this latter is concerned, since this latter may move out of line with the shaft 1 to an extent limited only by the space between itself and one end of the tubular structure 18. The plate clutch as a whole may rightly be considered as embodying the universal joint necessary between the shafts 1 and 4 and hitherto placed outside of the clutch structure so as not to necessitate a supporting bearing.

While the members 24 and 25 may properly be described as constituting a toothed clutch, it is obvious that owing to their peculiar construction and mounting they none-the-less form a universal joint operatively connecting the parts to which they are respectively attached, so that in referring to them either of these terms or designations may be correctly and properly used.

I claim:

1. The combination of a clutch; a shaft; a universal coupling within the clutch connecting the latter to the shaft, and a brake for the shaft having the co-acting faces of its members curved substantially concentric with the center of motion of said universal coupling.

2. The combination of a clutch including a casing and a tubular operating structure; a shaft; a universal coupling in the casing connecting one of the clutch members and the shaft; and a brake having its members respectively fixed to said tubular structure and to the shaft; the co-acting faces of said brake members being curved concentrically with the point of oscillation of the universal coupling.

3. The combination of a plate clutch; a shaft extending into said clutch; means for loosely and permanently connecting said shaft and clutch, the same consisting of an internally toothed structure fitting into said clutch and an externally toothed structure mounted on the shaft in position to coöperate with the other toothed structure to constitute a universal coupling; and a curved bearing washer mounted between the two elements of said coupling; with a brake for the shaft having the co-acting faces of its members curved substantially concentric with the center of motion of the coupling.

4. The combination of a clutch including a casing; a drum rotatably mounted in said casing; plates for connecting the drum and the casing; a toothed member rigidly mounted within but structurally independent of the drum; and a hub having an integral toothed plate loosely fitting within said first member so as to constitute a second clutch whose parts have a limited universal movement; with a brake for the clutch having the co-acting faces of its members curved to be substantially concentric with the center of motion of the clutch parts.

5. The combination of a clutch having a movable operating member; a brake having one of its elements mounted on said operating member; a universal coupling within the clutch having one of its members connected to one of the clutch members; a shaft connected to the second of the members of the universal coupling and having a brake surface placed to co-act with the said first brake surface, said brake surfaces being curved to be substantially concentric with the point of oscillation of the shaft; with means for actuating the brake and the clutch.

In testimony whereof, I have signed my name to this specification, in the presence of two subscribing witnesses.

POWELL EVANS.

Witnesses:
  WILLIAM E. BRADLEY,
  WM. A. BARR.